(No Model.)
L. BECK.
MOTOR.
No. 424,451. Patented Apr. 1, 1890.
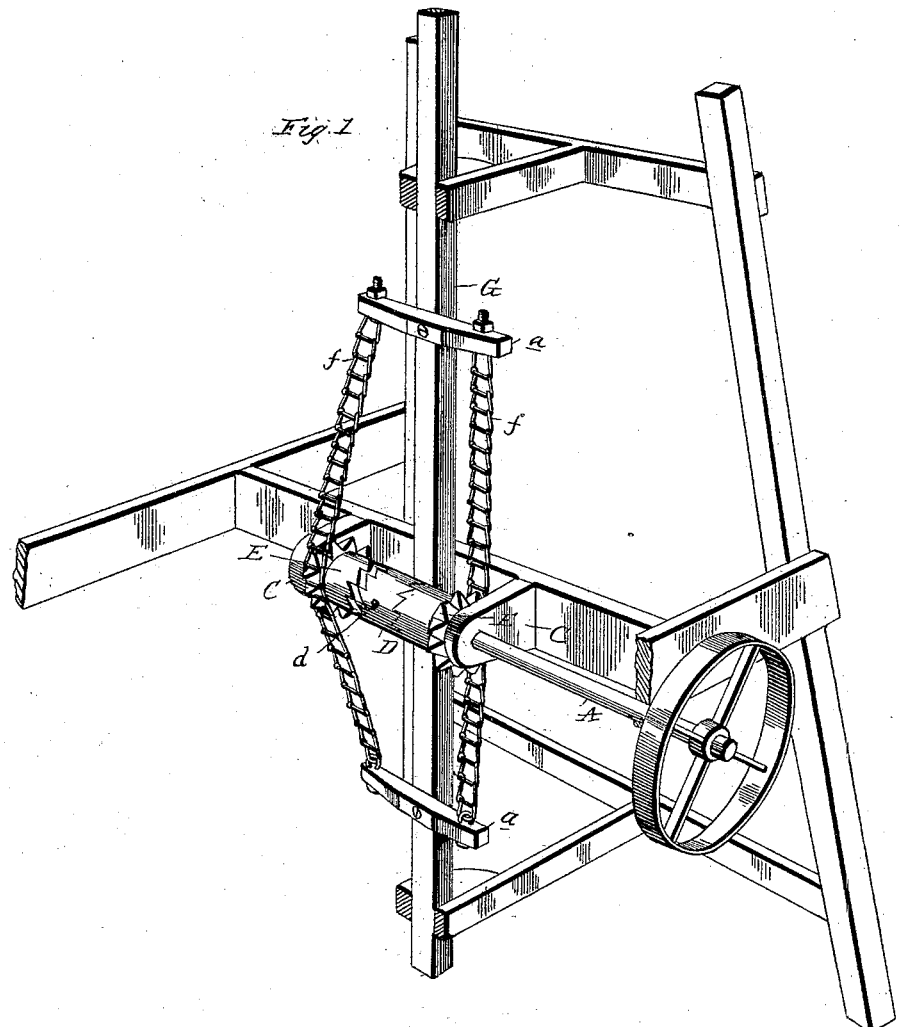
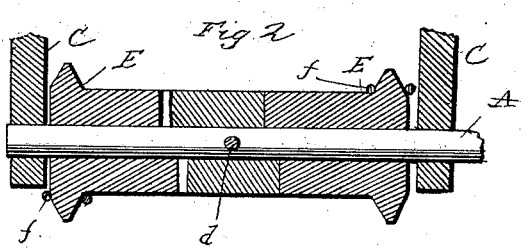
Witnesses
Inventor
Louis Beck.
By his Attorneys

UNITED STATES PATENT OFFICE.

LOUIS BECK, OF CLIFTON, ILLINOIS.

MOTOR.

SPECIFICATION forming part of Letters Patent No. 424,451, dated April 1, 1890.

Application filed July 10, 1889. Serial No. 317,087. (No model.)

*To all whom it may concern:*

Be it known that I, LOUIS BECK, a citizen of the United States, residing at Clifton, in the county of Iroquois and State of Illinois, have invented certain new and useful Improvements in Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to means for converting a reciprocating motion into a rotary motion, being especially adapted for windmills for transforming the reciprocating motion of the pump-rod into a rotary movement.

The improvement consists of the peculiar construction and combination of the parts, which will be hereinafter more fully described and claimed, and which are shown in the annexed drawings, in which—

Figure 1 is a perspective view of my invention. Fig. 2 is a longitudinal section of the device.

The shaft A, journaled in suitable bearings C C, is provided with the double-ended ratchet-collar D, which is keyed thereto by pin *d*. The two sprocket-wheels E—one on each side of the collar D—have teeth on the ends opposing the ends of the collar D, the teeth at the end of one wheel being the reverse of the teeth at the end of the other wheel, whereby when the teeth of one wheel are in engagement with the teeth at the end of the collar D the teeth of the other wheel are riding on the teeth at the opposite end of the collar. These sprocket-wheels E are mounted on the shaft so as to turn freely thereon, and are operated by the sprocket-chains *f*, which are stretched between the arms *a* on the reciprocating rod G. One chain passes over one side of the wheel E and the other chain passes over the opposite side of the other wheel. These chains are held under tension, and are so disposed relative to the wheels E and collar D that they hold the teeth on the said wheels in engagement with the teeth on the collar and permit the wheels to move on the shaft when the teeth on the opposing ends of the collar and wheel are riding over each other.

The operation of the device is manifest from the foregoing detailed description, reference being had to the annexed drawings; hence a further description is deemed unnecessary.

Having thus described my invention, what I claim, and desire to secure by Letters Patent, is—

1. The combination of the shaft having secured thereon the collar which is provided with teeth at each end, the sprocket-wheels on the shaft having teeth to engage with the teeth on the collar, and the operating-chains held under tension and arranged on opposite sides of the sprocket-wheels, substantially as and for the purpose described.

2. The combination, with the reciprocating rod and the shaft, of the collar secured on the shaft, having teeth at each end, the two sprocket-wheels, one at each end of the collar, and the operating-chains held under tension against opposite sides of the sprocket-wheels, substantially as and for the purpose described.

In testimony whereof I affix my signature in presence of two witnesses.

LOUIS BECK.

Witnesses:
W. S. GARDINER,
E. A. GARDINER.